INVENTORS
RICHARD T. SHORT
CLIVE PINNINGTON

United States Patent Office 3,438,817
Patented Apr. 15, 1969

3,438,817
METHOD OF MAKING FUEL CELL ELECTRODE INCLUDING RESIN AND RESULTANT PRODUCT
Richard T. Short, Newton, and Clive Pinnington, Farndon, near Chester, England, assignors to Shell Oil Company, New York, N.Y., a corporation of Delaware
Filed Dec. 7, 1965, Ser. No. 512,055
Claims priority, application Great Britain, Dec. 8, 1964, 49,896/64
Int. Cl. H01m 27/06
U.S. Cl. 136—120       5 Claims

ABSTRACT OF THE DISCLOSURE

An electrode for use in a fuel cell comprising of a nonconductive strata having impregnated thereon an electrically conductive film to which are bonded at least two catalytic layers with dissimilar bonding agents.

---

Figure 1:
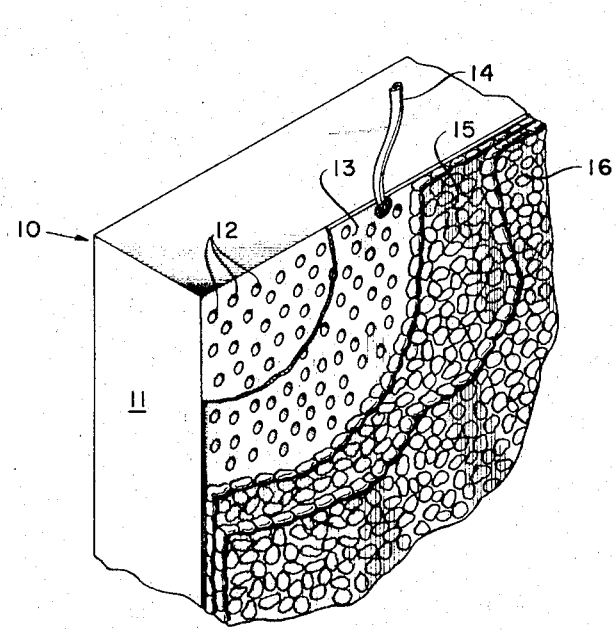

The present invention relates to electrodes for use in electrochemical processes, and more particularly, to an improved gas-electrode for use in electrochemical processes wherein a gas is one of the reactants.

In certain types of electrochemical processes, gas or gases may be used as the reactant or reactants and in these types of processes, conventional electrodes are highly inefficient. An example of the process using gas or gases is a hydrogen-fueled fuel cell wherein hydrogen gas must be introduced into the fuel cell in a manner whereby the hydrogen will have a large hydrogen-electrolyte-electrode interface so that electrical interaction can occur within the cell and electrical current caused to flow in the external surface of the cell.

Much research on gas electrodes has been prompted by the promise of the fuel cell as a future source of electrical energy. In developing gas-electrodes, it is necessary that a more or less triple interface be present at the electrode. This triple interface requires the presence of gas which is a reactant, the electrolyte and the gas-electrode surface for a high efficiency gas-electrode.

Accordingly, it is an object of this invention to provide a highly efficient gas-electrode which gives a large reactant gas-electrolyte-electrode interface.

Another object is to provide an improved gas-electrode which has a longer service life than previously available gas-electrodes.

Also, it is an object to provide a technique for producing gas-electrodes more economically while increasing the efficiency of the electrode.

The above objects and others, which will be more apparent from the drawings and specific description which follows, can be accomplished by preparing an electrode with a microporous substrate of non-conductive material, then deposition of a conductive layer on the substrate and thereafter gluing at least two separate layers of catalytic particles onto the conductive layer, said layers of catalytic particles being fluid permeable after the binder is cured.

By the above technique, a gas-electrode is prepared having a microporous non-conductive substrate, a porous electrically conductive layer or film of conductive material on at least one surface of the substrate, a first catalytic layer of catalytical particles glued to the electrically conductive layer and at least one additional catalytic layer of catalytical particles glued to the first catalytic layer, said respective catalytic layers being fluid permeable after the binders have cured.

Figure 2:
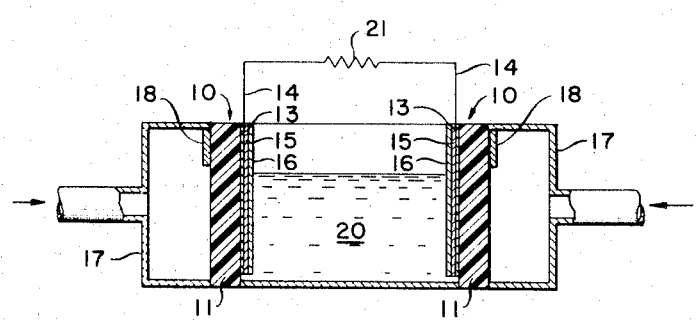

The invention will be better understood by referring to the drawings accompanying this application wherein:

FIGURE 1 is a perspective of a corner of a gas-electrode prepared according to this invention with parts of the various layers of materials broken away to show their relative relationships; and FIGURE 2 is a section of a simple fuel cell employing the novel electrodes of this invention.

Referring to FIGURE 1, the gas-electrode 10 consists mainly of a porous substrate 11 which is the principle structural element of the gas-electrode. The substrate 11 is a non-conductive material such as a microporous plastic material. Examples of microporous plastic materials are the microporous structure of polyvinyl chloride, polyethylene and polystyrene. Also sintered glass, porcelain and the like porous materials may be used for the substrate.

The terminology "porous" has been used with reference to the substrate 11 and here porous means that the non-conductive material used for the substrate is capable of passing fluids, such as hydrogen gas, even when the substrate is thoroughly wetted by an electrolyte. Since it is difficult to pictorially show the microporous structure of the substrate 11, a plurality of holes 12 are shown in the substrate to illustrate the porous characteristics of the substrate 11.

Subsequent to the selection of substrate 11 and forming the general gas-electrode structure from it, a thin, electrically conductive film 13 is deposited on at least one surface of the substrate. It is important that this film be relatively thin in order to avoid bridging the pore structure in the microporous substrate 11. Normally, the average pore diameter of the substrate 11 is usually in the range of ¼ micron to 25 microns and preferably from 1 to 8 microns, thus care must be taken not to bridge the small pores 12 with the conductive film 13. A convenient way of obtaining the conductive film 13 on the substrate is by vacuum deposition of metals suitable for the film. Both silver and rhodium, to name two, are suitable for such techniques and can be applied as relatively thin films to the substrate with no danger of bridging the microporous structure. In general, the thickness of the conductive film on the pore substrate 11 is in the range of 0.03 micron to 50 microns and is deposited on the substrate in such a manner that none of the holes or pores 12 in the substrate will be covered over by the conductive film 13. Further, it should be appreciated that only a thin vacuum deposited film may be applied to the electrode initially and this layer can subsequently be built up with the same or other metals by electro-deposition of metals onto the conductive film 13. For example, it is often desirable to increase the thickness of a thin vapor deposited film on the substrate by electro-deposition of platinum or platinum black on the vacuum deposited film to obtain the range of film thickness mentioned above.

At this point, it should be appreciated that the gas-electrode 10 will consist of a microporous substrate 11 of relatively non-conductive material and an electrically conductive film 13 secured to at least one surface of the substrate. Irregularities in the surface of the substrate will cause the conductive film 13 to adhere satisfactorily to the substrate. This conductive film 13 serves as the gas-electrode's primary electrical distribution bus and an electrical lead 14 is connected to this film in order to conduct current from or distribute current to the electrode.

Subsequent to the attachment of lead 14 to the conductive film 14 deposited on the substrate 11, the gas-electrode 10 is completed by applying two thin coats or layers of finely divided catalytic particles onto the conducting film 13 using a binder or glue to retain these catalytic particles on the electrode. The layers are applied separately, one being superimposed on the other and in some cases, it may be desirable to have a plurality of independent separately applied layers.

These catalyst particles may be selected from any one of the numerous materials which are suitable for catalyzing the electrode reactions in the particular electrochemical process being carried out. For example, in a fuel cell, suitable catalysts for the hydrogen-electrode are platinum, palladium, asmium, iridium, rhodium, ruthenium, nickel, silver and carbon. Alternatively, the catalyst particles may be mixtures of one or more of the aforementioned materials. It is desired that these catalysts be in finely divided form in order to provide a large amount of surface area for the gas-electrolyte-electrode interface, and the smaller the particles, the greater the surface area. Ideally these finely divided catalyst particles are applied to the conductive film 13 in two or more layers built up on the surface of the conductive film 13. Further, the catalyst particles are actually glued to conductive film 13 with a binder in a manner such that the particles themselves, which are conductive materials, will contact the conductive film 13 which serves as the electrical bus of the electrode and thereby becomes a part of the electrode. Put another way, these particles applied onto the conductive film 13 in the first catalytic layer 15 actually form a conductive path between themselves and the conductive film 13. Of course, the second catalytic layer 16, which is applied over the first catalytic layer 15, contacts the conductive particles in the first layer which in turn contact the conductive film 13 of the electrode and it can be appreciated that many of the finely divided particles applied to the electrode in both the first and second catalytic layers are actually electrically connected with the conductive film 13 and capable of accepting or giving up electrons in an electrochemical process. It should be appreciated that adding these finely divided conductive catalytic particles to the surface of the conductive film 13 manifestly increases the surface area of the electrode and thus increases its efficiency.

However, at this point, it should be recognized that the catalytic particles applied to the surface of the electrodes, must be applied in a manner so that they are retained thereon and also whereby a substantial portion of their surfaces are available for electrochemical processes. Also, since this is a gas-electrode, it is important that they be applied in layers which are fluid permeable so that gas and liquids can move around and through these particles and undergo electrochemical reactions. In the instant invention, these criteria are satisfied through the use of selected binders or glues to secure the layers of catalytic particles to the electrode. Of course, the binders are of considerable importance and they must be capable of securing the catalytic particles adequately to the electrode and not suffer degradation from the electrochemical reaction occurring around them. It is desired that these binders bond the solid catalytic particles together only at very restricted contact points and not inhibit the electrical conductivity between the bonded particles.

Examples of binders suitable for the practice of this invention are chlorinated polyvinyl chloride, polymethyl methacrylate and polyethylene. Usually, these binders are prepared through the use of a suitable solvent and mixed with the catalytic materials. After they have been applied to the electrode, the solvent evaporates, leaving the catalytic particles secured on the conductive film 13 of the gas-electrode. Further, it has been indicated that it may be desirable to use a different binder for the first catalytic layer than is used for the subsequent catalytic layers.

For example, the first catalytic layer can be a mixture of platinum black and carbon wherein the platinum to carbon ratio lies in the range of 1:99 to 1:1 and preferably, between 1:5 and 1:15. This finely divided mixture of catalytic particles can be glued to the conductive film 13 of the electrode with a binder, such as polyethylene, in a suitable solvent wherein the catalyst to polyethylene ratio is in the range of 50:1 to 1:1 and preferably 25:1 to 2:1. Actually, the preferred range is 3:15 parts of catalyst per part of polyethylene with 12:7 parts of catalyst to 1 part of polyethylene being optimum. Subsequent to the preparation of this mixture, additional solvent may be added to the catalyst binder mixture to make it workable and thereafter it is spread thinly onto the conductive film 13 of the gas-electrode. After the first layer 15 of catalyst and binder has been applied to the electrode and has dried, a second layer 16 is applied on top of the first so that the electrode has at least two separately applied layers of catalyst and binder. Since both of the layers cure in a manner in which the binder material will represent only a very small portion of the layer, these layers will be porous and liquids and gases can flow therethrough and around the catalyst particles held within the layers. Of course, it is desired that the layers be kept relatively thin in order that the catalytic layers 15 and 16 will have a relatively high degree of porosity. If desired, the catalytic layers can be compressed under pressure after they have been applied to the conductive surface as described.

These novel electrodes can be used in a typical cell such as shown in FIGURE 2 wherein two electrodes are used. In the embodiment as shown in FIGURE 2, two gas headers 17 are fitted to the uncoated side of the microporous plastic material of the gas-electrodes 10 so that a gas coming through the header can be fed through this microporous material to the coated side thereof having the electrically conductive film 13 and at least two separate layers 15 and 16 respectively of catalytic particles. In the embodiment shown in FIGURE 2, the headers include baffle plates 18 which restrict the flow of gas into the microporous plastic materials to those selected for use.

Two of the gas headers 17 with their associated gas-electrode 10 are used to form two walls of a tank 19 for holding an electrolyte 20, such as 6 normal sodium hydroxide. Thereafter, electrical leads 14 of each gas-electrode is connected through a load 21 when the system is used as a fuel cell. The fuel cell gas can then be supplied through the several headers 17 and the current generated in the cell will flow through the load 21 thereby providing useful electrical energy.

The performance of these novel electrodes is demonstrated by the following examples which demonstrate their superior current output.

EXAMPLES I–V

Microporous polyvinyl chloride sheet sold under the registered trade name "Porvic" was coated on one side with a silver/rhodium layer. Catalyst consisting of 10% w. of palladium on carbon was then applied to the silver/rhodium layer.

The area of the electrode (one side) was 77.4 cm.$^2$. In each of the following comparative cases, the total amount of binder/catalyst on the silver/rhodium layer was 0.6 gram. The catalyst to binder ratio was 10:1. Two such electrodes were made, the electrodes in a fuel cell comprising an alkaline electrolyte and in Table I the nature of the layers and the corresponding output of the cell in amperes at 0.5 volt are given.

TABLE I

| Example No.: | Primary Layer Binder Material | Secondary Layer Binder Material | Current Output at 0.5 volt |
|---|---|---|---|
| I | Post chlorinated PVC [1] | Nil | 1.0 |
| II | Post chlorinated PVC | Post chlorinated PVC | 1.3 |
| III | Polyethylene | Nil | 7.8 |
| IV | do | Polyethylene | 8.3 |
| V | Post chlorinated PVC | do | 12.0 |

[1] PVC=polyvinyl chloride.
Sheet, polyvinylchloride.
Coating, silver-rhodium.
Catalyst, 10% wt. palladium on carbon.

From Table I, it is seen that electrodes wherein the catalyst was applied in two layers, i.e., electrodes in accordance with the present invention, give better results than do electrodes having the catalyst as a single layer. Furthermore, the result obtained for Example V shows that it is advantageous to use as binder for the primary layer a binder material having strong binding properties and which does not readily suffer degradation from the electrochemical reactions occurring at the electrodes of the fuel cell and as binder for the secondary layer, a material having grain forming properties.

In these experiments, methylene chloride was used as solvent for the post-chlorinated PVC (polyvinyl chloride) and carbon tetrachloride for the polyethylene. In the Examples II, IV and V illustrating the invention, the amount of catalyst and binder in each layer was 0.3 gram, thus giving a total of 0.6 gram of binder and catalyst for comparison with the non-inventive Examples I and III. In Examples II and IV, the primary layer was allowed to dry before the secondary layer was applied.

EXAMPLES VI–IX

Further, examples of electrodes in accordance with the present invention are given in Table II. As before, the total amount of binder and catalyst was 0.6 gram, applied to an electrode area of 77.4 cm.² and for the inventive examples each layer contained 0.3 gram binder and catalyst. Hypalon (registered trademark) is a chlorosulfonated polyethylene.

Chloroform was used as the solvent for the Hypalon and methyl methacrylate, and carbon tetrachloride for polyethylene.

TABLE II

| Example No. | Primary Layer Binder Material | Secondary Layer Binder Material | Current Output at 0.5 volt |
| --- | --- | --- | --- |
| VI | Methyl methacrylate | Nil | 2.3 |
| VII | do | Polyethylene | 12.9 |
| VIII | Hypalon | Nil | 1.3 |
| IX | do | Polyethylene | 8.4 |

Sheet, coating and catalyst same as shown in Table I.

From Table II, it is again seen that electrodes wherein the catalyst was applied in two layers, in accordance with the present invention, Examples VII and IX give better results than do electrodes having the catalyst as a single layer, Examples VI and VIII.

EXAMPLES X–XII

The results of comparative life tests are given in Table III. In these tests, the output in amperes at 0.6 volt from a fuel cell comprising electrodes in accordance with the present invention was measured over extended periods of time. The electrodes used for the inventive examples and for the non-inventive example were similar to those used for Examples V, VII and III.

TABLE III

| Example No. | Primary Layer Binder Material | Secondary Layer Binder Material | Output in Amperes at 0.6 volt |
| --- | --- | --- | --- |
| X | Polyethylene | Nil | Initially 7.0; After 200 hours, 5.0; Thereafter falling rapidly. |
| XI | Post chlorinated PVC | Polyethylene | Initially 7.6; After 200 hours, 5.8; After 840 hours, 5.0. |
| XII | Methyl methacrylate | do | Initially 9.4; After 240 hours, 7.2; After 816 hours, 4.7. |

Sheet, coating and catalyst same as shown in Table I.

From Table III, it is seen that electrodes wherein the catalyst was applied in two layers, in accordance with the present invention, show a longer life than does an electrode having the catalyst as a single layer.

EXAMPLE XIII

A fuel cell system was constructed consisting of two uints, each unit containing two packs of 31 cells.

The electrodes of the cells were each provided with a double catalyst layer superimposed on a porous substrate of "Porvic" coated on one side with a porous layer of silver. The catalyst consisted essentially of platinum deposited on carbon in the ratio 1 part by weight platinum to 9 parts carbon.

The primary catalyst layer consisted essentially of 10 parts of catalyst mixture in one part of binder comprising post-chlorinated PVC; in preparing the admixture for the layer of the binder was dissolved in a solvent, methylene chloride.

The secondary layer was sprayed on the primary layer after drying of the latter, the spray mixture consisted mainly of ten parts of catalyst mixture in combination with one part of a low density polyethylene binder dissolved in a suitable solvent.

The electrode plates were pre-pressed prior to assembly in the cell. The fuel cell was fed with pure hydrogen gas and with air.

The whole system was run for a total of 25 hours at a net output of about 4 kw., the gross output being slightly higher than 5 kw. The difference (about 1 kw.) was used for driving the auxiliary equipment. On an average, the total current and the voltage were about 58 amps and about 87 volts, respectively.

We claim as our invention:

1. A novel gas-electrode suitable for use in a fuel cell comprising:
    (a) a fluid permeable substrate of electrically non-conductive material selected from the group consisting of a microporous plastic material and a porous glass-like material;
    (b) a thin film of from 0.03 to 50 microns thick of electrically conductive metallic material adhered to at least one surface of said fluid permeable substrate in a manner that it does not interfere with the fluid permeability of said substrate that is substantially a single, continuous porous film;
    (c) a first catalytic layer of finely divided catalytic particles selected from the group consisting of platinum, palladium, osmium, iridium, rhodium, ruthenium, nickel, silver, carbon and mixtures thereof bonded to the film of conductive material with a binder selected from the group consisting of post-chlorinated polyvinyl chloride, methyl methacrylate and chlorosulfonated polyethylene in a suitable solvent medium to said electrically conductive film; and
    (d) at least one additional catalytic layer of finely divided catalytic particles selected from the group consisting of platinum, palladium, osmium, iridium, rhodium, ruthenium, nickel, silver, carbon and mixtures thereof bonded to said first catalytic layer with a binder in a solvent medium both being dissimilar to the ones used under (c).

2. A method of making a gas-electrode suitable for fuel cells which comprises:
    (a) vacuum deposition of an electrically conductive metallic material onto a surface of an electrically non-conductive, fluid permeable substrate selected from the group consisting of a microporous plastic material and a porous glass-like material in a thickness of from 0.03 to 50 microns and in a manner which does not interfere with the fluid permeability of the substrate;

(b) bonding with polyvinyl chloride a first fluid permeable catalytic layer of finely divided electrically conductive catalytic particles selected from the group consisting of platinum, palladium, osmium, iridium, rhodium, ruthenium, nickel, silver, carbon and mixtures thereof onto the surface of the electrically conductive film; and (c) thereafter bonding with polyethylene a second fluid permeable catalytic layer of catalytic particles selected from the group consisting of platinum, palladium, osmium, iridium, rhodium, ruthenium, nickel, silver, carbon and mixtures thereof onto said first layer of catalytic particles to complete the electrode.

3. The method of claim 9 wherein the catalytic layers are compressed under pressure after they have been applied.

4. A method of making a gas-electrode suitable for fuel cells which comprises:

(a) vacuum deposition of an electrically conductive metallic material onto a surface of an electrically non-conductive, fluid permeable substrate selected from the group consisting of a microporous plastic material and a porous glass-like material in a thickness of from 0.03 to 50 microns and in a manner which does not interfere with the fluid permeability of the substrate;

(b) bonding with methyl methacrylate a first fluid permeable catalytic layer of finely divided electrically conductive catalytic particles selected from the group consisting of platinum, palladium, osmium, iridium, rhodium, ruthenium, nickel, silver, carbon and mixtures thereof onto the surface of the electrically conductive film; and, (c) thereafter bonding with polyethylene a second fluid permeable catalytic layer of catalytic particles onto said first layer of catalytic particles to complete the electrode.

5. A method of making a gas-electrode suitable for fuel cells which comprises:

(a) vacuum deposition of an electrically conductive metallic material onto a surface of an electrically non-conductive, fluid permeable substrate selected from the group consisting of a microporous plastic material and a porous glass-like material in a thickness of from which does not interfere with the fluid permeability of the substrate;

(b) bonding with chlorosulfonated polyethylene a first fluid permeable catalytic layer of finely divided electrically conductive catalytic particles selected from the group consisting of platinum, palladium, osmium, iridium, rhodium, ruthenium, nickel, silver, carbon and mixtures thereof onto the surface of the electrically conductive film; and, (c) thereafter bonding with polyethylene a second fluid permeable catalytic layer of catalytic particles selected from the group consisting of platinum, palladium, osmium, iridium, rhodium, ruthenium, nickel, silver, carbon and mixtures thereof onto said first layer of catalytic particles to complete the electrode.

References Cited

UNITED STATES PATENTS

| 3,097,974 | 7/1963 | McEvoy et al. | 136—120 |
| 3,222,224 | 12/1965 | Williams et al. | 136—86 |
| 3,248,267 | 5/1966 | Langer et al. | 136—86 |
| 3,276,909 | 10/1966 | Moos | 136—120 |

WINSTON A. DOUGLAS, *Primary Examiner.*

O. F. CRUTCHFIELD, *Assistant Examiner.*

U.S. Cl. X.R.

117—107, 217